(12) United States Patent
Rendon

(10) Patent No.: US 9,492,040 B1
(45) Date of Patent: Nov. 15, 2016

(54) WALL-MOUNTED TOWEL RACK

(71) Applicant: Juan Rendon, Elgin, IL (US)

(72) Inventor: Juan Rendon, Elgin, IL (US)

(*) Notice: Subject to any disclaimer, the term of this patent is extended or adjusted under 35 U.S.C. 154(b) by 0 days.

(21) Appl. No.: 14/881,266

(22) Filed: Oct. 13, 2015

(51) Int. Cl.
*A47K 10/04* (2006.01)
*A47B 43/00* (2006.01)
*A47B 45/00* (2006.01)
*F16B 7/14* (2006.01)

(52) U.S. Cl.
CPC .............. *A47K 10/04* (2013.01); *A47B 43/00* (2013.01); *A47B 45/00* (2013.01); *F16B 7/1472* (2013.01)

(58) Field of Classification Search
CPC ...... A47K 10/04; A47K 10/06; A47K 10/10; A47B 43/00; A47B 45/00; A47B 61/02; D06F 57/12; F16B 7/1472
USPC .......................................... 211/88.04, 96–99
See application file for complete search history.

(56) References Cited

U.S. PATENT DOCUMENTS

| | | | |
|---|---|---|---|
| 109,648 A * | 11/1870 | Myers | A47K 10/04 211/100 |
| 1,361,739 A * | 12/1920 | Matheson | A47B 61/003 211/99 |
| 1,494,916 A * | 5/1924 | Jones | D06G 57/12 211/1.3 |
| 1,582,762 A * | 4/1926 | Klock | A47G 25/0685 211/100 |
| 1,587,676 A | 6/1926 | Patterson | |
| 1,788,166 A * | 1/1931 | Marden | A47K 10/04 211/99 |
| 2,075,279 A * | 3/1937 | Good | A47J 47/16 211/106 |
| 2,126,513 A * | 8/1938 | Sterrett | A47K 10/04 211/172 |
| 2,147,172 A * | 2/1939 | Poole | D06F 57/12 211/99 |
| 2,179,216 A * | 11/1939 | Kalks | D06F 57/12 211/99 |
| 2,481,797 A | 9/1949 | Turner | |
| D157,431 S | 2/1950 | Hoop | |
| 2,754,010 A | 7/1956 | Griffith | |
| D282,705 S | 2/1986 | Chap | |
| 6,845,870 B2 | 1/2005 | Yang | |
| 9,051,680 B1 * | 6/2015 | Harris | D06F 53/045 |
| 2010/0193493 A1 * | 8/2010 | Yeung | A47K 10/06 219/201 |

* cited by examiner

*Primary Examiner* — Patrick Hawn

(57) ABSTRACT

The wall-mounted towel rack is a device adapted to be mounted on a vertical surface, and which is also adapted to support a plurality of towels thereon. The wall-mounted towel rack includes a plurality of armatures that are pivotably engaged with respect to a mounting member. The plurality of armatures is each attached to and is perpendicularly-engaged with respect to the mounting member. Moreover, the plurality of armatures is each able to extend and retract an armature length in order to support towels of varying sizes. An armature hinge attaches between the mounting member and one of the plurality of armatures. The armature hinge enables the one of the plurality of armatures to rotate from a vertical orientation to a horizontal orientation.

7 Claims, 5 Drawing Sheets

WALL-MOUNTED TOWEL RACK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of towel-hanging racks, more specifically, a towel rack that is wall-mounted, and is adapted to support a plurality of differently-sized towels simultaneously.

Towel racks are used to support one or more towels. Traditional towel racks feature a bar that enables at least one towel to be hung there from. However, these types of towel racks do not enable a wet towel to be free to hang in an unfolded position in order to dry. This can be problematic in wet or moist environments, such as adjacent a shower.

What is needed and is accomplished via the device of the present disclosure is a towel rack that can extend outwardly to enable a towel to hang in an unfolded position so as to enable access to air in order to fully dry said towel.

SUMMARY OF INVENTION

The wall-mounted towel rack is a device adapted to be mounted on a vertical surface, and which is also adapted to support a plurality of towels thereon. The wall-mounted towel rack includes a plurality of armatures that are pivotably engaged with respect to a mounting member. The plurality of armatures is each attached to and is perpendicularly-engaged with respect to the mounting member. Moreover, the plurality of armatures is each able to extend and retract an armature length in order to support towels of varying sizes. An armature hinge attaches between the mounting member and one of the plurality of armatures. The armature hinge enables the one of the plurality of armatures to rotate from a vertical orientation to a horizontal orientation. Moreover, a release linkage and release button are included, and used to lock the one of the plurality of armatures at the horizontal orientation when in use or to enable the one of the plurality of armatures to rotate downwardly to the vertical orientation when not in use.

It is an object of the invention to provide a device that is adapted to be mounted on a vertical surface, and which is also adapted to support one or more towels thereon.

It is a further object of the invention to provide an armature that is able to pivot from a vertical orientation when not in use, to a horizontal orientation when in use in supporting a towel thereon.

It is a further object of the invention to provide an armature that is able to extend or retract an armature length in order to support a towel of varying size.

This together with additional objects, features, and advantages of the wall-mounted towel rack will be readily apparent to those of ordinary skill in the art upon reading the following detailed description of the presently preferred, but nonetheless illustrative, embodiments when taken in conjunction with the accompanying drawings.

In this respect, before explaining the current embodiments of the wall-mounted towel rack in detail, it is to be understood that the Wall-mounted towel rack is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wall-mounted towel rack.

It is therefore important that the claims be regarded as including such equivalent construction insofar as they do not depart from the spirit and scope of the wall-mounted towel rack. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
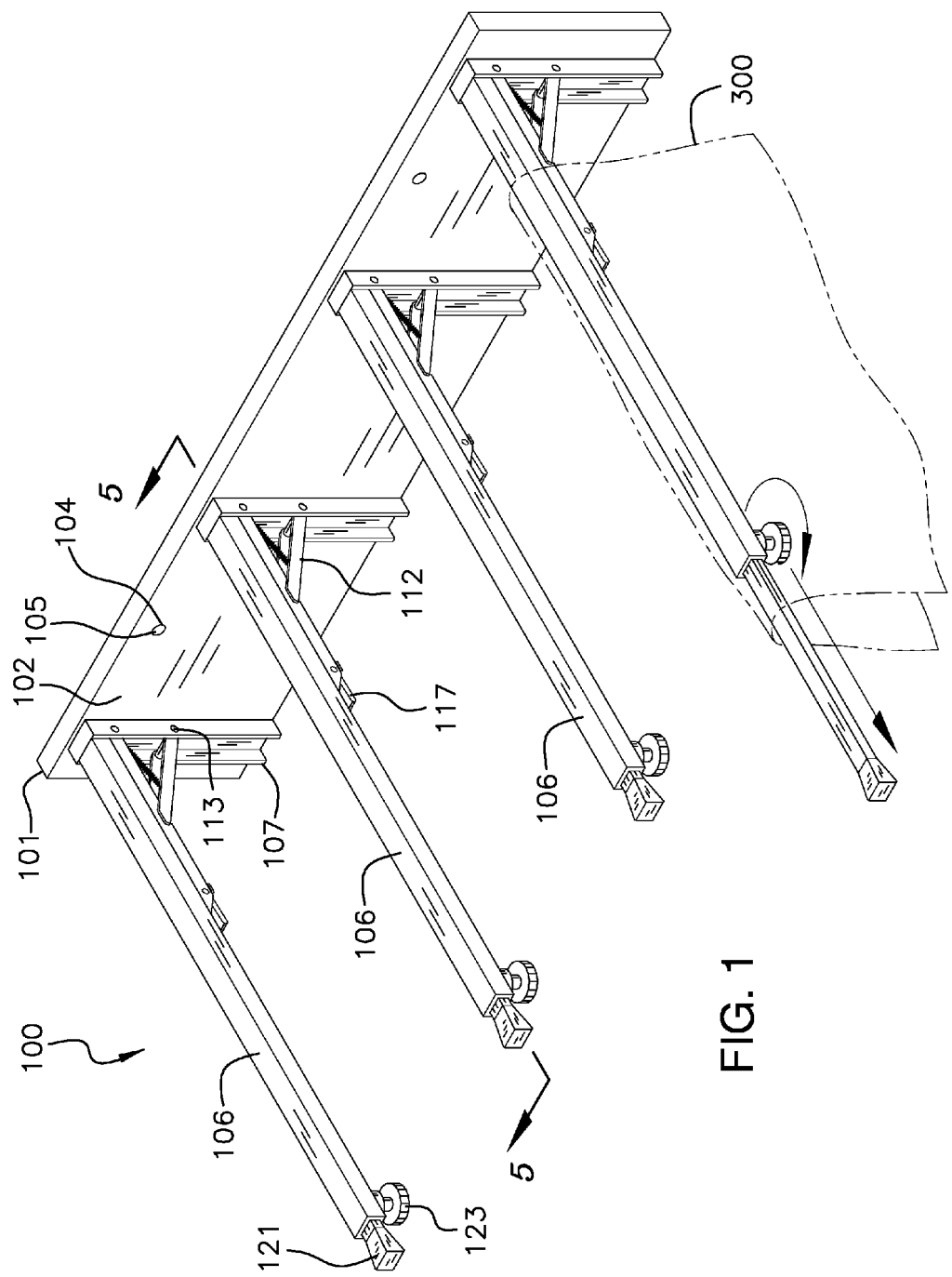
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The wall-mounted towel rack 100 (hereinafter invention) is further defined with a mounting member 101 that is a planar object, which is further defined with a first surface 102 and a second surface 103. The first surface 102 is opposite of the second surface 103. The second surface 103 is adapted to interface with a vertical surface 200. It shall be noted that the term, vertical surface 200, is being used to loosely refer to a wall.

The mounting member 101 includes at least one mounting hole 104 through which a fastener 105 is used to secure the mounting member 101 against the vertical surface 200. The fastener 105 comprises a bolt, screw, or nail. The first surface 102 is affixed to a plurality of armatures 106. The plurality of armatures 106 is adapted to support a towel 300 thereon.

The plurality of armatures 106 is individually affixed to the first surface 102 of the mounting member 101. Moreover, an armature hinge 107 is used to connect the mounting member 101 to each of the plurality of armatures 106. The plurality of armatures 106 is able to rotate from a vertical orientation to a horizontal orientation, and vice versa. The plurality of armatures 106 is perpendicularly-oriented with respect to the mounting member 101.

Figure 2:
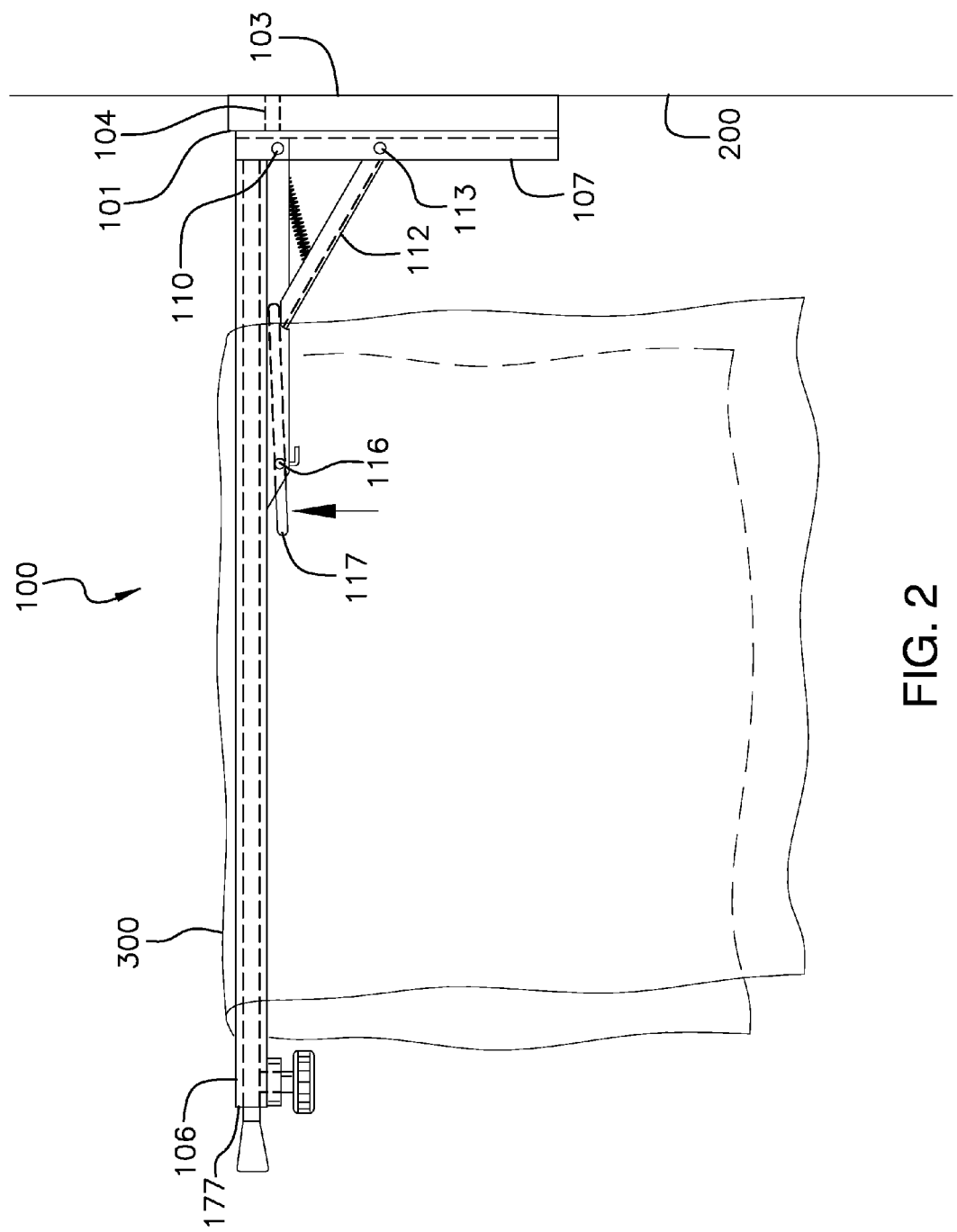
FIG. 2 is a front view of an embodiment of the disclosure in use.
Figure 3:
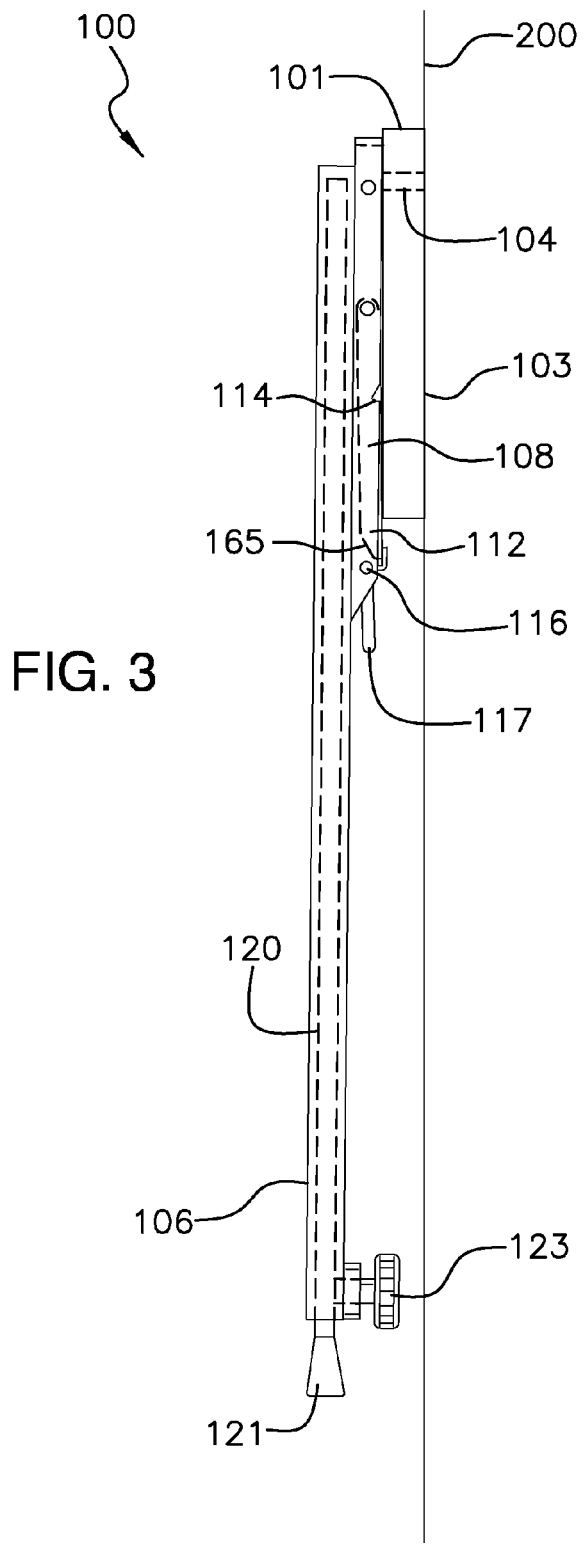
FIG. 3 is a side view of an embodiment of the disclosure in use.
Figure 4:
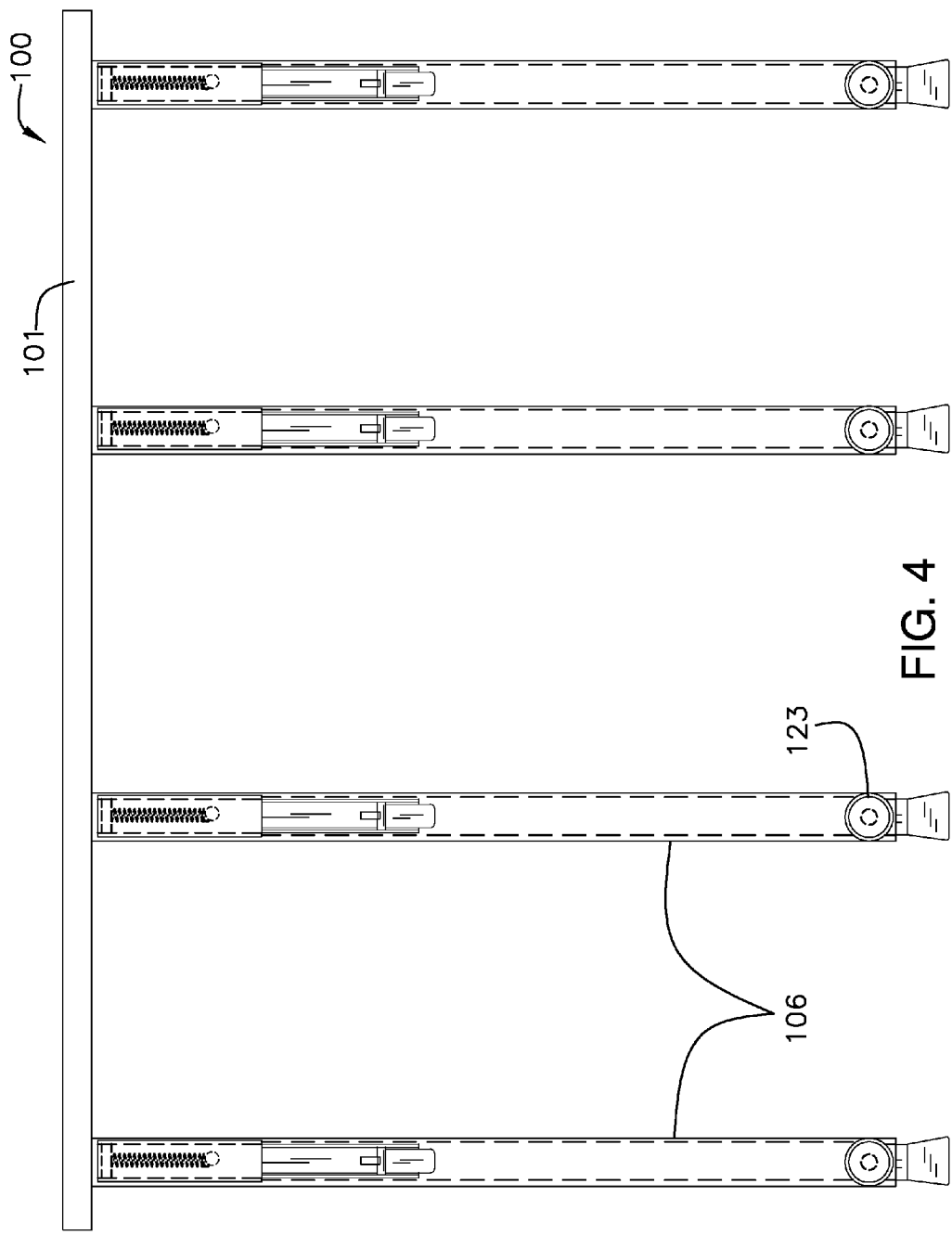
FIG. 4 is a bottom view of an embodiment of the disclosure.
Figure 5:
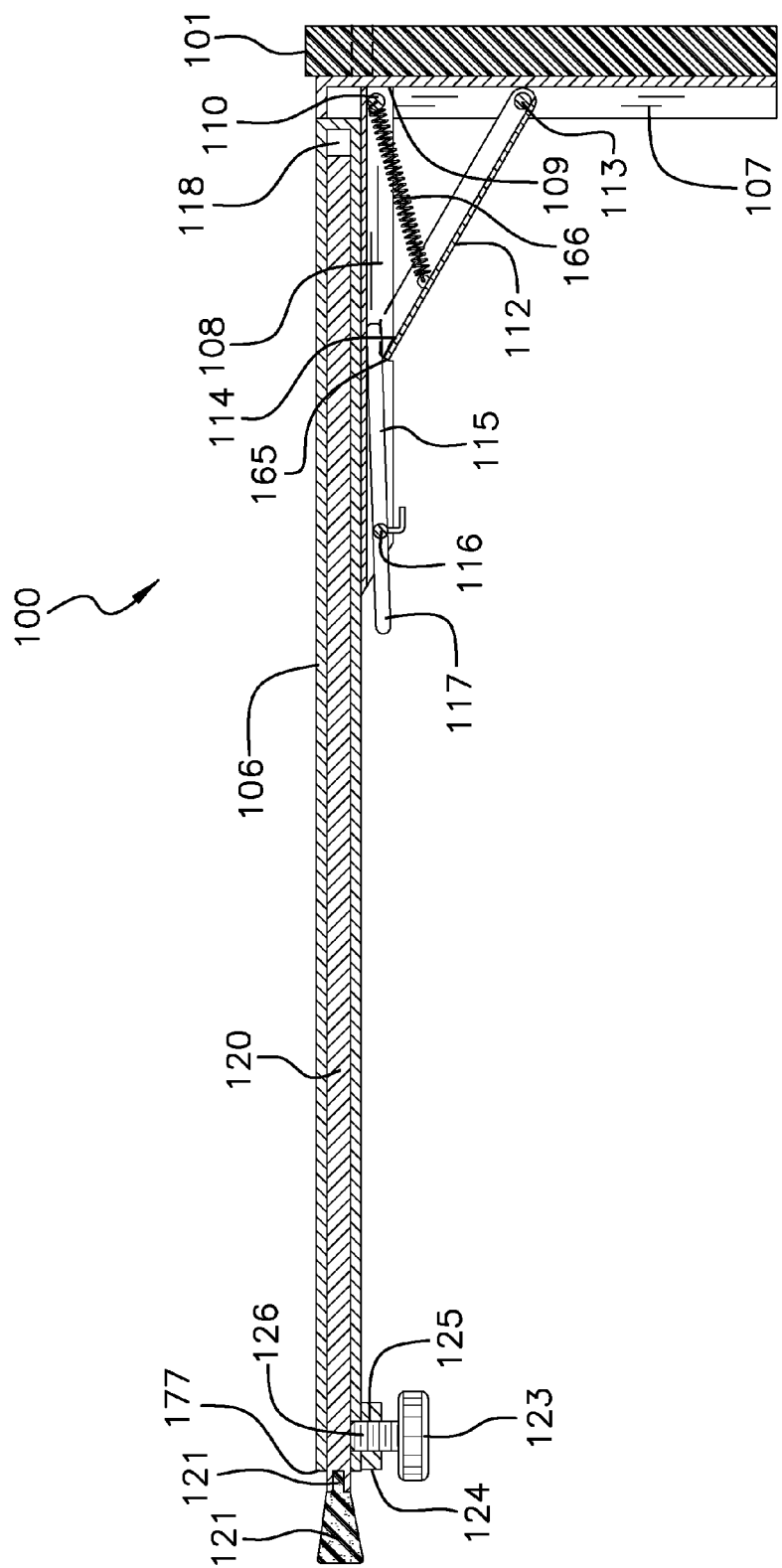
FIG. 5 is a cross-sectional view of an embodiment of the disclosure along line 5-5 in FIG. 1.

The armature hinge 107 is rigidly affixed to the first surface 102 of the mounting member 101, and enables one of the plurality of armatures 106 to rotate from a vertical orientation (see FIG. 3 when not in use) to a horizontal orientation (see FIG. 2 when in use).

The armature hinge 107 is a vertically-oriented object that is constructed of a "C" channel member. The one of the plurality of armatures 106 is affixed to an armature plate 108. The armature plate 108 is located at a first armature end 109, and is affixed to and rotates with respect to the armature hinge 107 via a pivot pin 110. The armature plate 108 enables a linkage member 112 to slide there against in order to support the armature plate 108 at a perpendicular orientation with respect to the armature hinge 107. The linkage member 112 is attached to the armature hinge 107 at a second pivot pin 113. The armature plate 108 is further defined with a linkage notch 114 that interacts with a third distal end 165 of the linkage member 112. The third distal end 165 of the linkage member 112 secures the linkage member 112 at an acute orientation with respect to the armature plate 108.

The linkage member 112 is affixed to a second linkage member 115. The second linkage member 115 extends to a fourth pivot pin 116. The fourth pivot pin 116 is rotatably engaged with respect to the armature plate 108. A release tab 117 is provided to rotate the second linkage member 115 at the fourth pivot pin 116, which in turn rotates the linkage member 112 at the third distal end 165 thereby disengaging the linkage member 112 with respect to the linkage notch 114 of the armature plate 108, and which enables the armature plate 108 to rotate from a horizontal position (see FIGS. 2 and 4) to a vertical orientation (see FIG. 3).

The linkage member 112 is biased via a linkage spring 111. The linkage spring 111 is affixed between the linkage member 112 and the pivot pin 110. The linkage spring 111 ensures that the linkage member 112 does not simply rotate downwardly and become completely disengaged with the armature plate 108. Also, the linkage member 112 is pivotably affixed to the armature hinge 107 via the second pivot pin 113.

The plurality of armatures 106 is each further defined with a cavity 118, which extends across an armature length 119. The cavity 118 enables a second armature member 120 to slide back and forth with respect to the one of the plurality of armatures 106 in order to adjust the armature length 119. The second armature member 120 is further defined with a tip member 121 located at an armature distal end 122. The second armature member 120 is able to be secured at various locales with respect to the one of the plurality of armatures 106 via a locking knob 123.

The one of the plurality of armatures 106 includes a collar member 124 that includes a threaded hole 125 there under. The collar member 124 enables a threaded member 126 of the locking knob 123 to screw in or out in order to lock or unlock the second armature member 120 with respect to the one of the plurality of armatures 106. The locking knob 123 is located adjacent an armature distal end 177 of each of the plurality of armatures 106.

In use, the invention 100 is adapted to support a plurality of towels 300 on the plurality of armatures 106. Moreover, the second armature member 120 is able to extend or retract with respect to the one of the plurality of armatures 106 in order to adjust the armature length 119. The adjustment of the armature length 119 enables the towel 300 to be of varying sizes. The plurality of armatures 106 are also able to rotate from a horizontal orientation to a vertical orientation, when no longer needed.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A wall-mounted towel rack comprising:
   a mounting member from which a plurality of armatures extend;
   wherein each of the plurality of armatures is able to independently pivot from a horizontal orientation to a vertical orientation;
   wherein each of the plurality of armatures is adapted to support a towel thereon;
   wherein the mounting member is a planar object, which is further defined with a first surface and a second surface;
   wherein the first surface is opposite of the second surface;
   wherein the second surface is adapted to interface with a vertical surface;
   wherein the mounting member includes at least one mounting hole through which a fastener is used to secure the mounting member against the vertical surface;
   wherein the first surface is affixed to the plurality of armatures;
   wherein the plurality of armatures is individually affixed to the first surface of the mounting member;
   wherein an armature hinge is used to connect the mounting member to each of the plurality of armatures;
   wherein the plurality of armatures is able to rotate from a vertical orientation to a horizontal orientation, and vice versa;
   wherein the plurality of armatures is perpendicularly-oriented with respect to the mounting member;

wherein the armature hinge is rigidly affixed to the first surface of the mounting member, and enables one of the plurality of armatures to rotate from said vertical orientation to said horizontal orientation;

wherein the armature hinge is a vertically-oriented object that is constructed of a "C" channel member; wherein the one of the plurality of armatures is affixed to an armature plate;

wherein the armature plate is located at a first armature end, and is affixed to and rotates with respect to the armature hinge via a pivot pin;

wherein the armature plate enables a linkage member to slide there against in order to support the armature plate at a perpendicular orientation with respect to the armature hinge;

wherein the linkage member is attached to the armature hinge at a second pivot pin; wherein the armature plate is further defined with a linkage notch that interacts with a first distal end of the linkage member; wherein the first distal end of the linkage member secures the linkage member at an acute orientation with respect to the armature plate;

wherein the linkage member is affixed to a second linkage member; wherein the second linkage member extends to a fourth pivot pin; wherein the fourth pivot pin is rotatably engaged with respect to the armature plate.

2. The wall-mounted towel rack according to claim 1 wherein a release tab is provided to rotate the second linkage member at the fourth pivot pin, which in turn rotates the linkage member at the first distal end thereby disengaging the linkage member with respect to the linkage notch of the armature plate, and which enables the armature plate to rotate from a horizontal position to a vertical orientation.

3. The wall-mounted towel rack according to claim 2 wherein the linkage member is biased via a linkage spring; wherein the linkage spring is affixed between the linkage member and the pivot pin; wherein the linkage spring ensures that the linkage member does not rotate downwardly and become completely disengaged with the armature plate.

4. The wall-mounted towel rack according to claim 3 wherein the plurality of armatures is each further defined with a cavity, which extends across an armature length; wherein the cavity enables a second armature member to slide back and forth with respect to the one of the plurality of armatures in order to adjust the armature length.

5. The wall-mounted towel rack according to claim 4 wherein the second armature member is further defined with a tip member located at an armature distal end; wherein the second armature member is able to be secured at various locales with respect to the one of the plurality of armatures via a locking knob.

6. The wall-mounted towel rack according to claim 5 wherein each one of the plurality of armatures includes a collar member that includes a threaded hole there under; wherein the collar member enables a threaded member of the locking knob to screw in or out in order to lock or unlock the second armature member with respect to the one of the plurality of armatures; wherein the locking knob is located adjacent an armature distal end of each of the plurality of armatures.

7. The wall-mounted towel rack according to claim 6 wherein the wall-mounted towel rack is adapted to support a plurality of towels on the plurality of armatures; wherein the second armature member is able to extend or retract with respect to the one of the plurality of armatures in order to adjust the armature length; wherein the adjustment of the armature length enables the towel to be of varying sizes; wherein the plurality of armatures are also able to rotate from a horizontal orientation to a vertical orientation, when no longer needed.

* * * * *